United States Patent
Wettstein et al.

(10) Patent No.: US 6,697,756 B2
(45) Date of Patent: Feb. 24, 2004

(54) METHOD AND A GENERATING MODULE FOR DETERMINING FILTER MASKS FOR RELEVANCE TESTING OF IDENTIFIERS

(75) Inventors: Horst Wettstein, Karlsruhe (DE); Helmut Schelling, Hemmingen (DE)

(73) Assignee: Vector Informatik GmbH, Stuttgart (DE)

( * ) Notice: Subject to any disclaimer, the term of this patent is extended or adjusted under 35 U.S.C. 154(b) by 108 days.

(21) Appl. No.: 10/117,052

(22) Filed: Apr. 8, 2002

(65) Prior Publication Data

US 2002/0147562 A1 Oct. 10, 2002

(30) Foreign Application Priority Data

Apr. 7, 2001 (EP) .............................. 01108787

(51) Int. Cl.$^7$ ................................ G06F 19/00
(52) U.S. Cl. ....................... 702/122; 709/206; 709/250; 709/217; 710/305; 714/43
(58) Field of Search ................... 702/62, 108, 188; 710/305; 709/204, 206, 207, 217, 225, 250; 714/43

(56) References Cited

U.S. PATENT DOCUMENTS 5,729,755 A * 3/1998 Turski ........................ 710/305
5,761,424 A * 6/1998 Adams et al. ............... 709/217
6,356,936 B1 * 3/2002 Donoho et al. .............. 709/206

FOREIGN PATENT DOCUMENTS

EP          0 993 144 A2    4/2000
WO       WO 01/20854 A1    3/2001

* cited by examiner

Primary Examiner—John Barlow
Assistant Examiner—John Le
(74) Attorney, Agent, or Firm—Browdy and Neimark, P.L.L.C.

(57) ABSTRACT

A method for determining filter mask for the relevance testing of identifiers, which are able to be transmitted to a communication device by way of a communication network in messages, with the steps of: determining relevance identifiers relevant for the communication device, and determining irrelevance identifiers irrelevant for the communication device, determining at least on initial filter mask in each case for each relevance identifier, which is passable for the respective relevance identifier and is not passable for the irrelevance identifier, combining at least two initial filter masks as a combination filter mask, which is passable for the respective relevance identifier associated with the respective initial filter mask and testing the respective combination filter mask, same being retained instead of its respective basic initial filter masks, if all irrelevance identifiers are able to be masked with the combination filter mask or being rejected, it is passable for at least one irrelevance identifier.

17 Claims, 4 Drawing Sheets

| FX | FV | RE | REV |
|---|---|---|---|
| 301 | 11110110 | RE1 | 11110110 |
| 302 | 11110011 | RE2 | 11110011 |
| 303 | 11110000 | RE3 | 11110000 |
| 304 | 11000110 | RE4 | 11000110 |
| 305 | 11000001 | RE5 | 11000001 |
| 306 | 10000101 | RE6 | 10000101 |
| 307 | 10000011 | RE7 | 10000011 |
| 308 | 10000001 | RE8 | 10000001 |
| 309 | 01101001 | RE9 | 01101001 |
| 310 | 01100010 | RE10 | 01100010 |
| 311 | 01100001 | RE11 | 01100001 |
| 312 | 01001010 | RE12 | 01001010 |
| 313 | 01001001 | RE13 | 01001001 |
| 314 | 01001000 | RE14 | 01001000 |
| 315 | 01000111 | RE15 | 01000111 |
| 316 | 01000010 | RE16 | 01000010 |

Fig. 3a

| FX | FV | RE |
|---|---|---|
| 301 | 11110110 | RE1 |
| 302b | 1XXX0011 | RE2, RE7 |
| 303 | 11110000 | RE3 |
| 304 | 11000110 | RE4 |
| 305b | 1X000X01 | RE5, RE6, RE8 |
| 309b | 01X0X001 | RE9, RE11, RE13 |
| 310b | 01X0X010 | RE10, RE12, RE16 |
| 314 | 01001000 | RE14 |
| 315 | 01000111 | RE15 |

Fig. 3b

| FX | FV | RE |
|---|---|---|
| 301 | 11110110 | RE1 |
| 302b | 1XXX0011 | RE2, RE7 |
| 303 | 11110000 | RE3 |
| 304 | 11000110 | RE4 |
| 305b | 1X000X01 | RE5, RE6, RE8 |
| 309c | 01X0X00X | RE9, RE11, RE13, RE14 |
| 310b | 01X0X010 | RE10, RE12, RE16 |
| 315 | 01000111 | RE15 |

Fig. 3c

| FX | FV | RE |
|---|---|---|
| 305b | 1X000X01 | RE5, RE6, RE8 |
| 310b | 01X0X010 | RE10, RE12, RE16 |
| 309c | 01X0X00X | RE9, RE11, RE13, RE14 |
| 302b | 1XXX0011 | RE2, RE7 |
| 301 | 11110110 | RE1 |
| 303 | 11110000 | RE3 |
| 304 | 11000110 | RE4 |
| 315 | 01000111 | RE15 |

Fig. 3d

| FX2 | FV | RE | H |
|---|---|---|---|
| 401 | X00000XX | RE401 -RE408 | 51 |
| 402 | 10101110 | RE409 | 1 |
| 403 | 10101101 | RE410 | 1 |
| 404 | 10000100 | RE411 | 1 |

Fig. 4

| FX3 | FV | RE | H |
|---|---|---|---|
| 501 | X0000X00 | RE503, RE507, RE511 | 14 |
| 502 | 10X0XX01 | RE502, RE510 | 9 |
| 503 | 10X0XX10 | RE501, RE509 | 9 |
| 504 | X00000XX | RE504, RE505, RE506, RE508 | 7 |

Fig. 5

METHOD AND A GENERATING MODULE FOR DETERMINING FILTER MASKS FOR RELEVANCE TESTING OF IDENTIFIERS

BACKGROUND OF THE INVENTION

The invention relates to a method for determining filter masks for relevance testing of identifiers which are able to be transmitted by way of a communication network in messages to a communication means, comprising the following steps:

determining relevance identifiers relevant for the communication means, and determining irrelevance identifiers irrelevant for the communication means.

Moreover, the invention relates to such a generating module.

In communication networks messages are frequently transmitted to numerous destination communication means in so-called broadcast methods. The receiving destination communication means must therefore determine whether a message is relevant for them using an identifier contained in the respective message, generally binarily encoded, as for example a destination and/or source address, for the content of the message. Typical examples of this are bus systems in which the bus participants all receive messages transmitted by way of a bus.

In order to free the principal functional groups of a communication means, for example its central processor and/or central process or processes from filtering assignments, more particularly in the case of bus systems test means for the relevance testing of identifiers are provided in their transmitting and receiving modules which are responsible for transmission and reception of the messages, and such test means test the incoming identifiers using filter masks to determine or find their relevance. If such an identifier stands up to a comparison with one of the filter masks, that is to say it is a question of relevance identifier, the respective message is passed on to the principal functional group of the communication means but otherwise rejected. Test means, which are preferably realized by hardware or hardware-like software, are for example provided in transmission and reception modules for controller area network (CAN) buses, i. e. as CAN controllers. However, they may also be employed in a software process responsible for transmission and reception.

However, the number of the memory locations provided in a transmitting and receiving module is limited so that it is not possible to install a respective filter mask, for instance a binary code identical to them, for each relevance identifier. Furthermore, the test task becomes involved, if a long list of filter masks has to be gone through for testing one identifier.

It would be possible to combine several filter masks together as a combination filter masks, which is passable by several relevance identifiers associated with the respective initial filter masks. Those positions at which the respective initial filter masks differ, are marked as free positions or "don't care" positions in the case of a combination filter mask made up of such filter masks. However, combination filter masks with free positions are frequently able to be passed by (i.e. are transparent to) irrelevance identifiers so that messages, which are irrelevant for the respective communication means, must be processed by the principal functional component group thereof.

SHORT SUMMARY OF THE INVENTION

One object of the invention is to determine a minimized number of filter masks for relevance testing of identifiers, which may be transmitted to a communication means by way of a communication network in messages.

A further object of the invention is to ensure that using the filter masks the irrelevant identifiers may be filtered out by the filter masks in a optimum manner.

In order to achieve these and/or other objects appearing from the present specification, claims and drawings, in the present initially mentioned method the following steps are provided for:

determining at least one initial filter mask in each case for each relevance identifier, which is not passable for the respective relevance identifier and is not passable for the irrelevance identifier, combining at least two initial filter masks as a combination filter mask, which is passable for the respective relevance identifier associated with the respective initial filter masks, and testing the combination filter mask, same being retained instead of its respective basic initial filter masks, if all irrelevance identifiers are able to be masked with the combination filter mask or being rejected, it is passable for at least one irrelevance identifier.

For achieving the object of the invention a generating module is also provided, which is provided with means for performing the steps.

The combination filter mask is no longer determined and employed in a more or less random manner, and is now determined on the basis of systematic combination of initial filter masks and testing of the respectively produced combination filter mask as regards non-passability for the irrelevance identifiers so that the irrelevance identifiers are able to be filtered out not only by the initial filter masks, but also by the combination filter mask in an optimum manner.

Further advantageous developments of the invention are defined in the claims.

It is an advantage for combination filter masks to be formed from initial filter masks and/or combination filter masks and to be retained or rejected following testing with the irrelevance identifiers until at least one predetermined interrupt criterion is reached, and more particularly until no further combination filter mask can be produced, which is unpassable for all irrelevance identifiers or until the number or, respectively, sum of combination filter masks and of initial filter masks not replaced by such combination filter masks has reached a predetermined value. The number of the combination filter masks and of the initial filter masks not replaced by them is accordingly minimized.

To the extent that for instance a desired number of the combination filter masks and of initial filter masks not replaced by such combination filter masks can not be reached, that is to say no (further) combination filter mask can be formed, which is not passable for all irrelevance identifiers, there is a provision such that at least one combination filter mask is formed from the initial filter masks and/or the combination filter masks and is retained instead of same, which is passable for at least one irrelevance identifier.

In keeping with such an advantageous form of the invention in the case of a selection of at least two combination filter masks, which are formed from initial filter masks and/or combination filter masks and are passable for at least one irrelevance identifier, that combination filter mask is selected and retained, which is passable for a smaller number of irrelevance identifiers and/or is passable for those irrelevance identifiers, which are transmitted with a lower frequency of occurrence probability in the communication network. Thus the impairment of a communication system is minimized, which would otherwise be caused by an undesired transparency for one or more irrelevance identifiers.

It is convenient for the combination filter masks to be passable for at least one irrelevance identifier only to be formed and retained until the sum of combination filter masks and of initial filter masks not replaced by such combination filter masks reaches a predetermined value. Therefore only as many combination filter masks passable for irrelevance identifiers are formed as is absolutely necessary.

It is an advantage in the case of a particularly preferred form of the invention to have a provision such that the initial filter masks are made into a grouped sequence, that the filter masks of the sequence are respectively combined with the respectively following filter masks in the sequence to give respective combination filter masks and the respective combination filter mask in lieu of the filter mask on which they are based is retained, it is not passable for all irrelevance identifiers. In principle other methods of proceeding are however possible, for example one in which the combination filter masks are formed from randomly selected initial filter masks.

In the case of the step by step combination of the filter masks of the sequence with the next following filter masks in the sequence there is an advantageous provision such that prior to the formation of the combination filter masks the initial order of the initial filter masks in the sequence is changed and that in the case of a selection of different initial orders an initial order is selected in accordance with a predetermined criterion and more particularly on the basis of the total number obtainable on the basis of the respective initial order of respective combination filter masks and of initial filter masks not replaced by such combination filter masks. In this case optimum filter masks are determined in a particularly systematic fashion.

It is not only the number of memory locations provided for the storage of filter masks, but furthermore the size of the individual memory locations which may be. For instance, typical identifiers in a CAN system are 11 bits long, whereas memory locations made available by CAN controllers (also named register locations) are frequently only designed for 8 bits. Although it would be possible to divide up a filter mask and share it between two register locations so that an 11 bit filter mask is able to be completely stored, the number of storable filter masks would then be halved.

For the optimum use of memory location capacity present there is therefore a provision such that the initial filter masks are masked using an initial mask to yield masked initial filter masks, a masked initial filter mask having several relevance identifiers for it and may be passable for them, and a masked initial filter mask is passable for one or more irrelevance identifiers, and for determining the combination filter masks the masked initial filter masks are employed and for testing the combination filter masks for unpassability of the combination filter masks preferably only those irrelevance identifiers are utilized, which on the basis of the masked initial filter masks, forming the basis of the respective combination filter mask, may be filtered out.

It will be clear that instead of masking with the initial mask, for example a right and/or left shift operation is possible, in the case of which for instance lowest value bits or, respectively, highest value bits of an identifier or of a filter mask are eliminated. In any case, the method in accordance with the invention and the convenient forms thereof are just as applicable to the masked initial filter mask and the combination filter mask determined therefrom as to the unmasked initial filter masks. Preferably, for testing the (masked) combination filter masks irrelevance identifiers masked with the initial mask are employed.

A masked initial filter mask can be passable for one or more irrelevance identifiers. If a combination filter mask is formed on the basis of such an initial filter mask, it will not be suitable for filtering out such relevance identifiers. Accordingly there is preferably a provision such that the combination filter mask is not tested with such irrelevance identifiers, which are already able to pass the initial filter mask forming the basis thereof.

There is preferably a provision such that the respective irrelevance identifiers masked with the initial mask are employed for testing a respective combination filter mask as regards unpassability. To the extent that the combination filter masks are tested as regards passability with reference to the relevance identifiers, it is also convenient for same, masked with the initial mask, to be employed for the above mentioned testing. In any case preferably on the basis of irrelevance identifiers, which are equivalent on the basis of the masking with the initial mask, only one is employed for testing the respective combination filter mask for unpassability or respectively in the case of one masked as being equivalent, only one respective relevance identifiers is used for testing the respective combination filter mask for passability. For instance, two identifiers are equal, if when unmasked they differ as regards their lowest value bit, but such bit is dropped on masking. In any case in this manner repetitions during testing of a filter mask are avoided.

Although in principle it is possible for the combination filter masks, and possibly retained initial filter mask, directly after determining them in accordance with the invention to be available for a communication means, there is preferably however a provision such that the combination filter masks and retained initial filter masks are sorted in accordance with at least one predetermined criterion and made available for the communication means. Such a criterion is for example the frequency of occurrence probability, in accordance with which the relevance identifiers associated with the respective combination filter masks or respectively initial filter masks are transmitted in the communication network. The communication means is therefore able to determine the relevance identifiers significant for it extremely rapidly, because same may be determined with the filter masks or masks at the start of the filter mask list.

As already indicated in the above mentioned examples, the irrelevance identifiers, the initial filter masks and the relevance identifiers are strings and more particularly binary strings and in each case have the same length. In this respect it is advantageous for the relevance identifiers and the initial filter masks associated with same firstly to be identical strings. It will be clear that other strings, as for example hexadecimal or alphanumeric strings are possible as identifiers and/or filter masks. Furthermore, an initial filter mask may even have several relevance identifiers allotted to it and for example have several so-called "don't care" digits or positions.

In principle the above mentioned identifiers may be any items in a respective message. Preferably however they will be address items, and more particularly destination and/or source address items, or serve as content identifiers for a message.

As a communication network in principle any broadcast network will come into question, in the case of which messages may be transmitted unspecifically and received by several recipients. However, it is more particularly advantageous to apply the invention to a bus system, more especially a controller area network (CAN) bus system or a local interconnect network (LIN) bus system.

In any case a communications means, as for example a CAN bus participant or a CAN interface component, also called a CAN controller, can be used to extremely rapidly and reliably determine the respectively irrelevant identifiers and to separate the respectively irrelevant irrelevance identifiers owing to the combination filter masks, which are formed by the method in accordance with the invention.

It will be clear that the method in accordance with the invention and the generating module of the invention may be employed "offline", in which case the identifiers are provided for the communication means using a separate development tool, as for instance a personal computer for implementing the generating module. The generating module can however also be run "online" as well, as for instance by a communication participant, if during actual operation of a communication network, for instance a CAN bus, there is some change in the quantity and/or composition of the identifiers employed in the respective communication network and accordingly new and/or modified filter masks must be provided for the communication network.

Further advantageous developments and convenient forms of the invention will be understood from the following detailed descriptive disclosure of one embodiment thereof in conjunction with the accompanying drawings.

DESCRIPTION OF SPECIFIC EMBODIMENTS OF THE INVENTION

Figure 1:
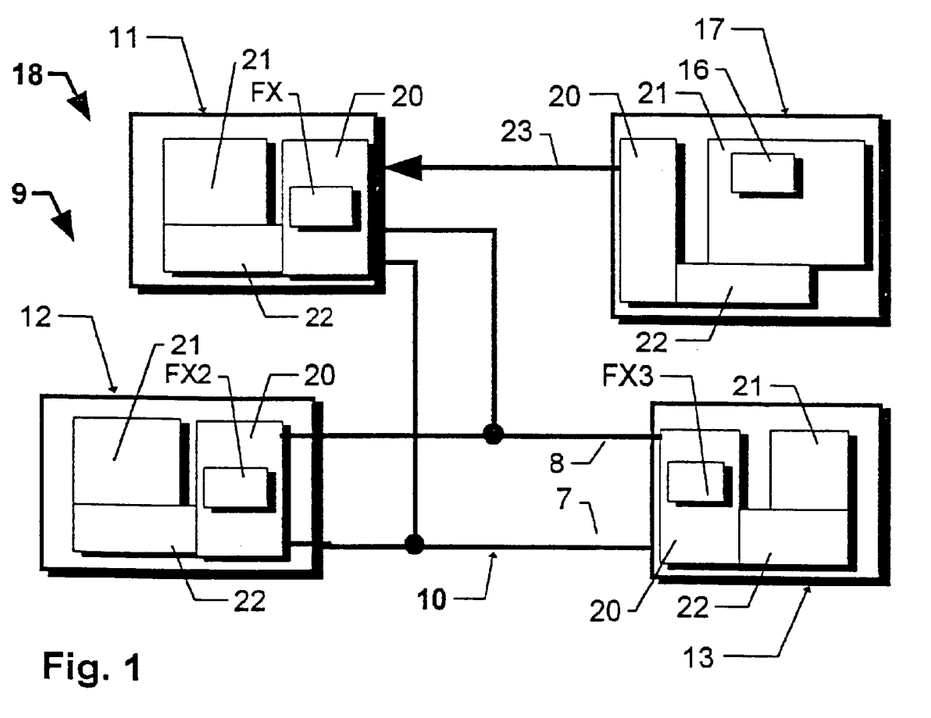
FIG. 1 diagrammatically shows a bus 10 with communication means 11, 12 and 13 and furthermore a development tool 17 with a generating module 16.

FIG. 1 shows a bus 10 constituting a communication network 9, as for example a CAN bus or an LIN bus, having communication means 11, 12 and 13 constituting bus participants. The bus 10 is arranged on a motor vehicle 18 and has bus lines 7 and 8, by way of which the communication means 11, 12 and 13 transmit and receive messages, each message transmitted by way of the bus 10 being received by all bus participants connected with the bus 10. In the case of the communication means 11, 12 and 13 it is for example a question of central or local component group control means, for instance for the control of a group of tailgate light or a range determineer of the motor vehicle 18.

Figure 2:
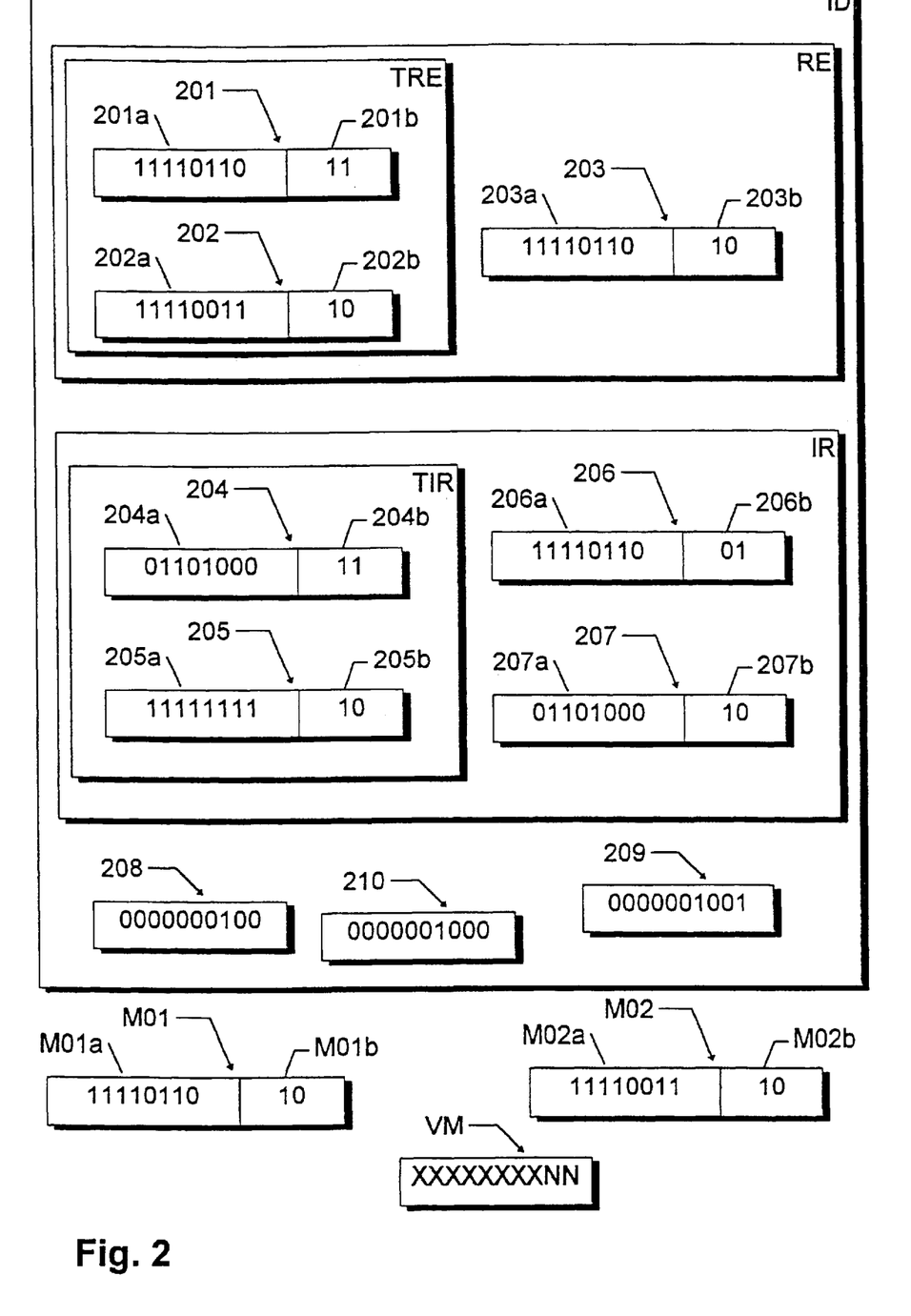
FIG. 2 is a diagrammatic representation of a set of identifiers ID with identifiers RE relevant for the communication means 11 and irrelevance identifiers IR irrelevant for the communication means.

The messages transmitted by way of the bus 10 comprise identifiers ID, which for instance serve as the destination or source address or as a content identifier for the respective content of the message. Examples for such identifiers are indicated in FIG. 2. In the case of the identifiers ID it is a question for instance of binary strings with 10 bit so that the set of the identifiers ID could theoretically comprise $2^{10}$ different identifiers, of which identifiers from 201 to 210 are indicated in FIG. 2 as examples. For identifying messages in the example of FIG. 2 the identifiers 201 to 207 are employed, whereas the identifiers 208, 209 and 210 and further identifiers, not illustrated, are not utilized for identifying messages.

For the communication means 11 the identifiers 201 to 203 are for example relevant and they are termed relevance identifiers RE in the following. The identifiers 204 to 207 on the contrary are irrelevant for the communication means 11 and in the following will be dubbed irrelevance identifiers IR. Inter alia for the transmission and reception of messages on the bus 10 the communication means 11, 12 and 13 comprise the following transmission and reception modules 20, storage means 21 as well as control means 22. The control means 22 are for instance processors or processor arrangements, with which program code may be implemented by program modules, which are stored in the storage means 21. The transmission and reception modules 20, in the case of which it is in the present case a question for example of so-called CAN controllers, are adapted to implement program code.

In the present case however same can not be dynamically loaded and is permanently written to the transmission and reception modules 20, for example in suitable logic circuits and/or as software in a ROM.

An identifier ID arriving at the transmission and reception module 20 of the communication means 11 is compared by it with the filter masks FX, which are held in registers, not illustrated. In the present case the registers comprise eight memory locations with 8 bits each. When the respective bit pattern of an identifier ID is identical at the significant positions to one of the filter masks FX, the message comprising the identifier ID will be passed on to the respective control means 22 but failing this the transmission and reception module 20 will classify the identifier ID as an irrelevance identifier IR and will discard the message.

In the following it will be assumed that for the communication module 11 the relevance identifiers RE1 to RE16 as depicted in FIGS. 3a to 3d are relevant. The relevance identifiers RE1 to RE16, which each comprise 8 bits, may be derived by way of a procedure, to be explained infra, from the relevance identifiers 201 to 203 illustrated in FIG. 2 and from further 10 bit relevance identifiers (not illustrated), relevant for the communication means 11.

The relevance identifiers RE1 to RE16 have REV values, which are specified in a column headed "REV" in the tables of FIGS. 3a to 3d. The relevant identifiers RE1 to RE16 have initial filter masks 301 to 316 associated with them, which are passable for the relevance identifiers RE1 to RE16, but not however for the irrelevance identifier IR, not illustrated. The transmission and reception module 20 merely checks to see whether a binary value of a received identifier ID is identical to one of the values FV of the filter masks 301 to 316.

Figure 3A:
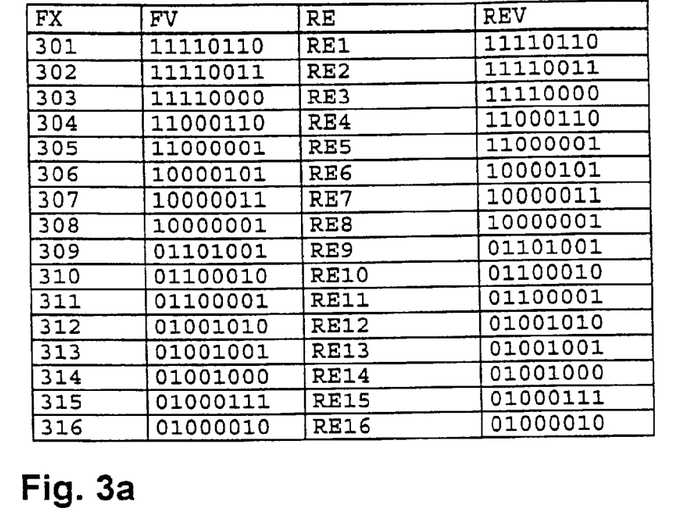
FIG. 3a is a concordance table for relevance identifiers RE1–RE16 and initial filter masks 301–316.

However, for determining the relevance identifiers RE1 to RE16 in all sixteen initial filter masks 301 to 316 are necessary. In the transmission and reception module 20 however only eight memory locations are provided for the storage of filter masks. It is consequently necessary to reduce the number of filter masks FX so that the eight memory locations are sufficient and furthermore all relevance identifiers RE1 to RE16 may be reliably determined by the transmission and reception module 20.

For determining the filter masks FX suitable in this respect a generating module 16 is provided, which is implemented by a development tool 17. In the case of this development tool it is a question of, for instance, a personal computer or of a workstation with one or more processors, serving as control means 22, having storage means 21, which for instance are RAM components, a fixed disk drive or the like, and furthermore input and output means (not illustrated), as for example a mouse, a keyboard or, respectively, a monitor. The generating module 16 comprises a program code, which is stored in the storage means 21 and is executed by the control means 22.

In principle it is also possible for the program code of the generating module 16 to be executed for instance by one of the communication means 11 to 13 or by a central control component (not illustrated) of the bus 10. In the working embodiment the generating module 16 generates the filter masks FX, FX2 and FX3 required by the communication means 11, 12 and 13 to determine the relevance identifiers relevant for same.

Taking as an example filter masks FX, which are determined by the generating module 16 for the communicating means 12 and are loaded in the means 11 by means of a transmission and reception module 20 by way of a download connection 23, in the following the generating method of the generating module 16 will be explained. The download connection 23 may be for instance a conventional serial connection, as for instance a V24 interface or a bus interface of the bus 10.

Firstly the generating module 16 determines the relevance identifiers RE1 to RE16 relevant for the communication means. For this purpose, for example using a control interface of the development tool 17, the generating module 16 determines the identifier values REV, indicated in FIG. 3a, of the relevance identifiers RE1 to RE16 or reads the identifier values REV from a file for example. Furthermore the generating module 16 determines the relevance identifiers IR irrelevant for the communication means 11. The same are substantially more numerous than the relevance identifiers RE1 to RE16 and hence not illustrated in the drawings. For instance, only one irrelevance identifier IRI with a value of "01101000" is named which may be formed in a manner to be explained later, for example from the irrelevance identifier 204 (see FIG. 2).

In the next step the generating module 16 determines an initial filter mask 301 to 316 for of the each relevance identifiers RE1 to RE16, which mask is passable for the respective relevance identifier RE1 to RE16 and is not passable for the irrelevance identifier IR. In a convenient form of the invention the generating module 16 assumes the identifier values REV for the initial filter masks 301 to 316. In principle it is however possible as well for the values FV of the initial filter masks 301 to 316 to depart from the identifier values RV, for example when free or "don't care" positions are provided in an initial filter mask in order to detect several relevance identifiers.

Figure 3B:
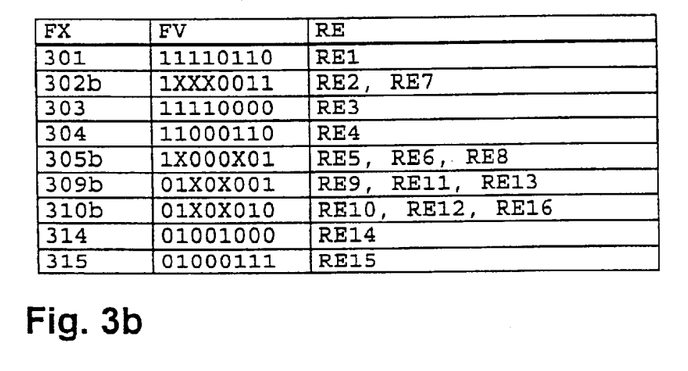
FIG. 3b is a continuation of the table of FIG. 3a, combination filter masks 301–316 being partly formed from the initial filter mask, such combination filter masks being unpassable for all irrelevance identifiers IR to be taken into consideration.

The generating module 16 then in sequence combines the filter mask 301 to 316 with each other and in each case tests whether the combination filter mask so determined is unpassable for the irrelevance identifier IR. A combination of the filter mask 301 with one or more filter masks 302 to 316 does not lead to such a desired result. Things are different with the filter mask 302, which, combined with the filter mask 307, produces a filter mask 302b, which is unpassable for the all irrelevance identifiers IR. On the other hand for the relevance identifiers RE2 to RE7 it is passable. For this purpose three free positions of the combination filter mask 302b are so-called or "don't care" positions, that is to say the three position below the highest value bit, which differ as far as the filter masks 301 and 307 are concerned, which is the basis of the combination filter mask 302b.

After the formation of the combination filter mask 302b the generating module 16 now combines the initial filter mask 303 with one of the following filter masks 304 to 315. This is just as incapable of leading to a combination filter mask which is unpassable for the irrelevance identifiers IR as a combination of the initial filter mask 304 with one of the following filter masks 305 to 316.

In any case combination filter masks are produced which are passable for at least one of the irrelevance identifiers IR.

In the course of further sequential combination of initial filter masks the generating module 16 determines a combination filter mask 305b from among the filter masks 305, 306 and 308, determines a combination filter mask 309b from among the filter masks 310, 311 and 313 and determines a combination filter mask 310b from among the filter masks 310, 312 and 316. The initial filter masks 314 and 315 are retained by the generating module 16, because the combination filter masks are not unpassable for all irrelevance identifiers IR.

For the result obtained in this manner and illustrated in FIG. 3b, in all nine memory locations for filter masks FX are required, although eight memory locations were desired. The generating module 16 could now, as an advantageous feature of the invention, make a new attempt at generating and for example vary the initial order of the filter masks 301 to 316. Here it is possible, although not described as part of the present embodiment, for the generating module 16 to comprise eight or less filter masks, which are not passable for all irrelevance identifiers IR.

Figure 3C:
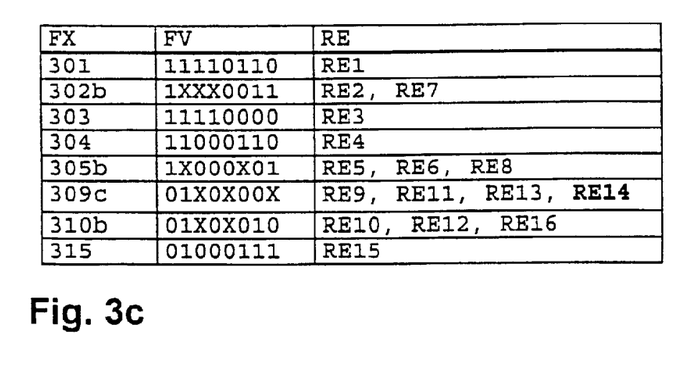
FIG. 3c is a continuation of the table of FIG. 3b, in the case of which a combination filter mask is modified in a manner such that it is passable for all irrelevance identifiers.

In the present case in hand however for reasons of clarity the present description the generating module 16 proceeds differently. The generating module 16 combines the initial filter mask 314 with the combination filter mask 309b and thus forms a combination filter mask 309c, which is passable for all irrelevance identifiers IR, with the exception of the irrelevance identifier IR1 ("01101000"). The generating module 16 has hence generated eight filter masks FX, same only being passable for a single irrelevance identifier.

Instead of the combination of the filter mask 314 with the combination filter mask 309b in principle other combinations would be possible, the combination filter masks then formed being possibly passable for a plurality of irrelevance identifiers IR. The respective modifications are checked by the generating module 16 and the respectively best one selected, in the present case, this being the combination filter mask 309c.

Furthermore the generating module 16 in the present case takes into account that the irrelevance identifier IR1 is comparatively seldom transmitted on the bus 10, for instance because the relevance identifier RE14 is in relation to a configuration or parametric message.

Figure 3D:
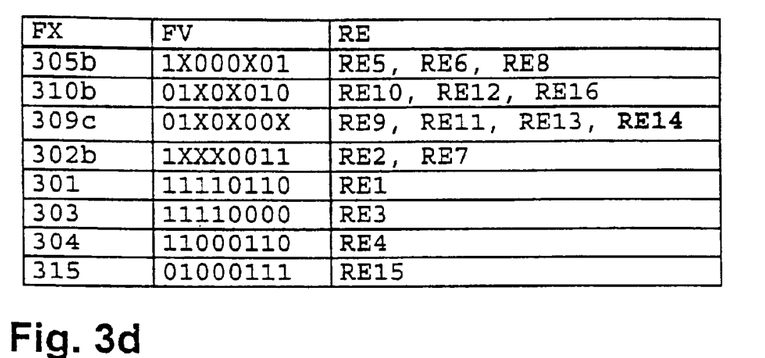
FIG. 3d is a continuation of the table of FIG. 3c, in which the filter masks are sorted in accordance with the frequency of occurrence of the relevance identifiers associated with them.

The filter masks FX in accordance with FIG. 3c could be transmitted now in the illustrated order to the communication means 11. In the present case however the generating module 16 optimizes the order of the filter masks FX so that those of the filter masks 301, 302b, 303, 304, 305b, 309c, 310b and 315 will be at the start of the list, same relating to relevance identifiers RE1 to RE16 frequently transmitted by way of the bus 10. The list of the identifiers FX is accordingly headed by the filter masks 305b, 310b and 309c, each having three relevance identifiers. Directly following the filter masks there comes the filter mask 302b, which relates to two relevance identifiers, and after this the filter masks 310, 303, 304 and 315 are included, which respectively relate to only one relevance identifier.

In the case of above mentioned order the basic principle is that the identifiers RE1 to RE16 are transmitted with an essentially identical frequency of occurrence as regards transmission by way of the bus 10. However, it is also possible for instance that the relevance identifier RE4 is comparatively frequently transmitted on the bus so that the associated filter mask 304 for it would have to head the list of the filter masks FX.

Figure 4:
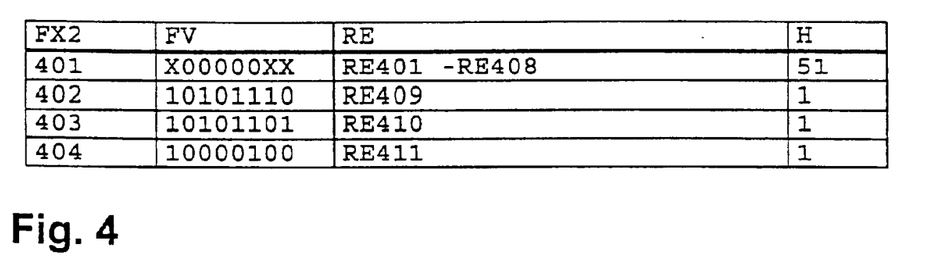
FIG. 4 is a table in which the filter masks 401–404 are sorted according to the frequency of occurrence of relevance identifiers RE401–RE411.
Figure 5:
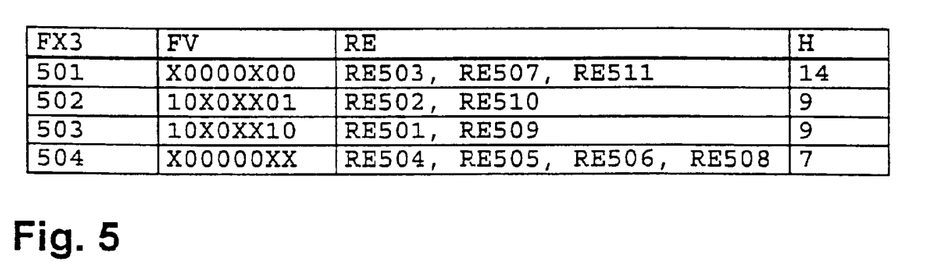
FIG. 5 is a table in which the filter masks 501–504 are sorted according to the frequency of occurrence of relevance identifiers RE501–RE511.

For the communication means 12 and 13 the generating module 16 produces filter masks FX2 or, respectively, FX3 (FIGS. 4 and 5) in the manner explained. For the communication means 12 relevance identifiers RE401 to RE411 are relevant. The relevance identifier RE401 to RE408 are associated with a combination filter mask 401 and are extremely frequently transmitted on the bus 10. They therefore have a frequency of occurrence indicator (H) of 51. On the other hand the relevance identifiers RE409 to RE411 are only transmitted with a frequency of occurrence indicator (H) of 1 on the bus 10. Consequently in the case of the filter masks FX2 the filter mask 401 is put first, whereas the filter masks 402 to 404 associated with the relevance identifiers 409 to 411 come further down on the list. In accordance with the table of FIG. 5 the filter masks 501 to 504 as well are arranged in accordance with the frequency of occurrence of the relevance identifiers RE501 to RE511, on which the same are respectively based. Although the filter mask 504 in all has four relevance identifiers RE504, RE505, RE506 and RE508 associated with it and is passable for them, it only has the frequency of occurrence indicator (H) of 7 and is hence placed at the tail of the table, whereas the filter mask 501, with which three relevance identifiers RE503, RE507 and RE511 are associated, heads the table, because the said relevance identifiers are comparatively frequently transmitted on the bus 10 and therefore the filter mask 501 has a frequency of occurrence indicator (H) of 14.

In the case of the working examples described so far it was assumed that the filter width of the filter masks FX, FX2 and FX3 was the same as the width of the identifiers actually transmitted on the bus 10, and in the specific case amounts to 8 bits. In what follows it will be assumed however that the messages transmitted by way of bus 10 do not comprise 8 bit long identifiers but 10 bit long ones, as is indicated in FIG. 2. The registers of the transmission and reception modules 20 still as previously offer memory locations with 8 bits for the storage of filter masks FX, FX2 and FX3.

Furthermore the set of irrelevance identifiers IR is incompletely illustrated in FIG. 2 in order to make the drawing more straightforward. It is only by way of example that identifiers 208 to 210 are indicated, which stand for further identifiers not employed on the bus 10.

The relevance identifiers RE relevant for the communication means 11 together with the relevance identifiers 201, 202 and 203, illustrated by way of example, and furthermore the irrelevance identifiers IR irrelevant for them with the irrelevance identifiers 204 to 207, represented by way of example, are masked with an initial mask VM, and the two respectively lowest-value bits 201b to 207b are masked. As masked identifiers 201a to 207a there remain respectively the eight highest-value bits of the initial identifiers 201 to 207. The identifier values of the masked relevance identifiers 203a and 201a are, as will be seen from FIG. 2, identical and are the same as the identifier value of the identifier RE1, whereas on the other hand the masked relevance identifiers 201a and 202a possess different identifier values.

Furthermore for the relevance identifiers 201 to 203 the generating module 16 determines initial filter masks M01 and M02, which are also masked with the initial mask VM so that respectively masked initial filter masks M01 and M02 are produced each with 8 bits. The filter mask values of the masked initial filter masks M01a and M02a correspond to the binary code of the masked relevance filter masks 202a and, respectively, 202a.

The masked initial mask M01a is passable both for the masked relevance identifier 201a and also for the masked relevance identifier 203a so that the masked initial filter mask M01a is also associated with the relevance identifier 203 and in the case of any testing of a combination filter mask as regards passability it is not absolutely essential to take the identifier 203 into account. The relevance identifiers 201 and 202 to be accordingly taken into account for testing or monitoring filter masks are denoted as a set TRE for the sake of clarity.

As regards the set of the irrelevance identifiers IR as well special conditions apply owing to the masking with the initial mask VM. For the testing of a combination filter mask formed from the initial filter masks, the filter masks M01a and M02a for example, having the same filter width as the initial filter masks, on which it is based, in the present special case 8, in the illustrated example the irrelevance identifiers 204 and 205 are to be taken into consideration, which are collected together in a set TIR. The irrelevance identifiers 206 and 207 on the other hand are not employed for testing a combination filter mask, because on the one hand the masked irrelevance identifier 207a possesses the same value as the masked irrelevance identifier 204a so that for example during testing of a combination filter mask (for instance the value "11110XX1") selected from the masked initial filter masks, it is sufficient to consider the masked irrelevance identifier 204a, whose value is the same as that of the irrelevance identifier IR1 mentioned in connection with FIG. 3. On the other hand owing to masking with the initial mask VM the masked irrelevance identifier 206a has the same value as the masked relevance identifiers 201a and 203a. Therefore the masked initial filter mask M01 is also passable for the masked irrelevance identifier 206a. Accordingly a combination filter mask formed by the initial filter masks M01 and M02 is also passable for the masked irrelevance identifier 206a and is thus, in a preferred form of the invention, not taken into account by the generating module 16 in such testing for passability of a combination filter mask.

For the formation of combination filter masks on the basis of masked initial filter masks the generating module 16 may essentially so operate as explained already with reference to FIGS. 3a to 3d. As mentioned, for instance, the masked relevance identifier 202a correspond to the relevance identifier RE1 and the masked relevance identifier 202a to the relevance identifier RE2. Further relevance identifiers, comprised in the set TRE, which are associated with relevance identifiers RE3 to R16, are omitted in FIG. 2 for the sake of clarity. of the masked irrelevance identifiers TIR, masked during testing of combination filter masks taken into account by the generating module 16, in conjunction with figures 3a to 3d only the masked irrelevance identifier IR1, corresponding to the masked irrelevance identifier 204a, is mentioned.

It will be clear that any desired combinations of the measures specified in the claims and in the specification are possible and further developments of the invention are readily possible.

For instance, it would be possible for the generating module 16 to be embodied as a control means 22 in the communication means 11 to 13, for example when there is some change in the set of RE relevance identifiers relevant for the respective communication means 11, 12 and 13.

The use of the filter masks FX, FX2 and FX3 is not limited to the transmission and reception modules 20, in the case of which the filter masks FX, FX2 and FX3 or the test modules or test routines provided in their software are evaluated. Furthermore, test modules or test routines provided in the communication means 11, 12 and 13 or in their software can be operated on the basis of the filter masks determined in accordance with the invention.

Although the invention is extremely advantageous in connection with bus systems, more particularly CAN or LIN buses, it may however be employed with advantage in the field of other communication networks, as for instance wireless networks.

What is claimed is:

1. A method for determining filter masks for relevance testing of identifiers which are able to be transmitted by way of a communication network in messages to a communication means, comprising the following steps:

determining relevance identifiers relevant for the communication means, and determining irrelevance identifiers irrelevant for the communication means, and the further steps of:

determining at least one initial filter mask in each case for each relevance identifier, which is passable for the respective relevance identifier and is not passable for the irrelevance identifier, combining at least two initial filter masks as a combination filter mask, which is passable for the respective relevance identifier associated with the respective initial filter masks, and testing the respective combination filter mask, same being retained instead of its respective basic initial filter masks, if all irrelevance identifiers are able to be masked with the combination filter mask or being rejected, it is passable for at least one irrelevance identifier.

2. The method as set forth in claim 1, wherein combination filter masks are formed from initial filter masks and/or combination filter masks and retained or rejected following testing with the irrelevance identifiers until at least one predetermined interrupt criterion is reached, and more particularly until no further combination filter mask can be produced, which is unpassable for all irrelevance identifiers or until the number or, respectively, sum of combination filter masks and of initial filter masks not replaced by such combination filter masks has reached a predetermined value.

3. The method as set forth in claim 1, wherein if no combination filter mask can be formed which is passable for all irrelevance identifiers, at least one combination filter mask is formed from the initial filter masks and/or the combination filter masks and is retained instead of same, which is passable for at least one irrelevance identifier.

4. The method as set forth in claim 1, wherein in the case of a selection of at least two combination filter masks, which are formed from initial filter masks and/or combination filter masks and are passable for at least one irrelevance identifier, the combination filter mask is selected and retained, which is passable for a smaller number of irrelevance identifiers and/or is passable for irrelevance identifiers, which are transmitted with a lower frequency of occurrence probability in the communication network.

5. The method as set forth in claim 4, wherein the combination filter masks passable for at least one irrelevance identifier only to be formed and retained until the sum of combination of filter masks and of initial filter masks not replaced by such combination filter masks reaches a predetermined value.

6. The method as set forth in claim 1, wherein the initial filter masks are made into a grouped sequence, the filter masks of the sequence are respectively combined in steps with the respectively following filter masks in the sequence to give respective combination filter masks and the respective combination filter mask is retained instead of the filter mask on which it is based if it is not passable for all irrelevance identifiers.

7. The method as set forth in claim 6, wherein prior to the formation of the combination filter masks the initial order of the initial filter masks in the sequence is changed and in the case of a selection of different initial orders an initial order in accordance with a predetermined criterion is selected, more particularly on the basis of the overall number of combination filter masks able to be obtained on the basis of the respective initial order, of combination filter masks and of initial filter masks not replaced by such combination filter masks.

8. The method as set forth in claim 1, wherein the initial filter masks are masked with an initial mask to give masked initial filter masks, a masked initial filter mask is associated with several relevance identifiers and may be passable for same and a masked initial filter mask being able to be passable for one or more irrelevance identifiers, and for determining the combination filter masks the masked initial filter masks are employed and for testing the combination filter mask as regards passability of the combination filter masks preferably only those irrelevance identifiers are employed, which may be filtered out on the basis of masked initial filter masks forming the basis of the respective combination filter masks.

9. The method as set forth in claim 8, wherein the respective irrelevance identifiers, masked with the initial mask, are utilized for testing a respective combination filter masks as regards unpassability, and preferably of masked irrelevance identifiers, equivalent on the basis of the masking to the initial mask, respectively only one is employed for testing the respective combination filter mask as regards unpassability.

10. The method as set forth in claim 1, wherein the combination filter masks and retained initial filter masks are sorted in accordance with at least one predetermined criterion, and more particularly in accordance with the frequency of occurrence probability, according to which the relevance identifiers, associated with the respective combination filter masks, are transmitted in the communication network, and are made available for the communication means.

11. The method as set forth in claim 1, wherein the irrelevance identifiers, the initial filter masks and the relevance identifiers are strings, and more especially binary strings, of equal length and the initial filter masks, respectively associated with same, are constituted by identical strings.

12. The method as set forth in claim 1, wherein the identifiers for address data, more particularly a source and/or destination address, of a respective message and/or a content identifier are provided for a content of the respective message.

13. The method as set forth in claim 1, wherein as a communication network a broadcast network and/or a bus system, more especially a CAN bus system or a LIN bus system is provided.

14. A communication means, more particularly a CAN participant or a CAN interface component, for relevance testing of identifiers on the basis of combination filter masks, which have been formed as set forth in claim 1.

15. A generating module for determining filter masks for relevance testing of identifiers, which are able to be transmitted to a communication means by way of a communication network in messages, comprising means for performing the steps of:

determining relevance identifiers relevant for the communication means, and     determining irrelevance identifiers irrelevant for the communication means, and the further steps of:

determining at least one initial filter mask in each case for each relevance identifier, which is passable for the respective relevance identifier and is not passable for the irrelevance identifier,         combining at least two initial filter masks as a combination filter mask, which is passable for the respective relevance identifier associated with the respective initial filter masks, and         testing the combination filter mask, same being retained instead of its respective basic initial filter masks, if all irrelevance identifiers are able to be masked with the combination filter mask or being rejected, it is passable for at least one irrelevance identifier.

16. The generating module as set forth in claim 16, comprising a program code, which may be executed by a control means of a motor vehicle or of a development tool or a communication means.

17. A motor vehicle or a development tool and more particularly a computer or workstation or programming tool or a communication means, more especially a CAN bus participant or a CAN interface component, with a generating module as set forth in claim 15.

* * * * *